United States Patent
Wadycki et al.

(10) Patent No.: US 9,977,822 B2
(45) Date of Patent: May 22, 2018

(54) MIGRATION OF FEEDBACK DATA TO EQUIVALENT DIGITAL ASSETS

(71) Applicant: Apple Inc., Cupertino, CA (US)

(72) Inventors: Andrew M. Wadycki, Santa Clara, CA (US); Ashish Sharma, Cupertino, CA (US); Michael H. Walker, Seattle, WA (US); Ricardo D. Cortes, Los Gatos, CA (US); Sebastien P. Sahuc, Piedmont, CA (US); Tracy L. Pirnack, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 148 days.

(21) Appl. No.: 14/738,581

(22) Filed: Jun. 12, 2015

(65) Prior Publication Data

US 2015/0278326 A1    Oct. 1, 2015

Related U.S. Application Data

(63) Continuation of application No. 13/740,031, filed on Jan. 11, 2013, now Pat. No. 9,087,341.

(51) Int. Cl.
*G06F 7/00*     (2006.01)
*G06F 17/00*    (2006.01)
(Continued)

(52) U.S. Cl.
CPC ...... *G06F 17/30575* (2013.01); *G06F 17/303* (2013.01); *G06Q 30/0217* (2013.01); *H04L 67/1095* (2013.01); *G06F 17/30772* (2013.01)

(58) Field of Classification Search
CPC ............ G06F 17/30575; G06F 17/303; G06F 17/30772; G06Q 30/0217; H04L 67/1095
See application file for complete search history.

(56) References Cited

U.S. PATENT DOCUMENTS

| 4,750,119 A | 6/1988 | Cohen et al. |
|---|---|---|
| 5,253,165 A | 10/1993 | Leiseca et al. |

(Continued)

FOREIGN PATENT DOCUMENTS

| EP | 1684223 | 7/2006 |
|---|---|---|
| EP | 2230620 | 9/2010 |

(Continued)

OTHER PUBLICATIONS

"AVCataloger Overview," NC Software, Inc., http://avcataloger.com/Products.aspx, downloaded Oct. 6, 2003, pp. 1-4.

(Continued)

*Primary Examiner* — Azam Cheema
(74) *Attorney, Agent, or Firm* — Blank Rome LLP

(57) ABSTRACT

Methods and systems for managing for migrating feedback data from one digital asset to another digital asset are disclosed. Typically, the one digital asset is available for distribution from a network-based media distribution system, but then subsequently is removed from distribution for any of a number of reasons. However, since the one digital asset has been in use at the network-based media distribution system, it has accumulated feedback data. Hence, if the another digital asset serves (e.g., due to equivalency) to replace the one digital asset, then the accumulated feedback data from the one digital asset can be transferred to the another digital asset. As a result, the another digital asset can benefit from the feedback data that was previously associated with the one digital assert.

23 Claims, 10 Drawing Sheets

(51) Int. Cl.
   *G06F 17/30* (2006.01)
   *G06Q 30/02* (2012.01)
   *H04L 29/08* (2006.01)

(56) References Cited

U.S. PATENT DOCUMENTS

| | | | |
|---|---|---|---|
| 5,410,598 A | 4/1995 | Shear | |
| 5,535,383 A | 7/1996 | Gower | |
| 5,627,973 A | 5/1997 | Armstrong et al. | |
| 5,752,128 A | 5/1998 | Yamashita | |
| 5,765,152 A | 6/1998 | Erikson | |
| 5,884,280 A | 3/1999 | Yoshioka et al. | |
| 5,943,422 A | 8/1999 | Van Wie et al. | |
| 6,067,531 A | 5/2000 | Hoyt et al. | |
| 6,085,253 A | 7/2000 | Blackwell et al. | |
| 6,151,643 A | 11/2000 | Cheng et al. | |
| 6,226,618 B1 | 5/2001 | Downs et al. | |
| 6,233,682 B1 | 5/2001 | Fritsch | |
| 6,263,313 B1 | 7/2001 | Milsted et al. | |
| 6,275,954 B1 | 8/2001 | Herman et al. | |
| 6,330,670 B1 | 12/2001 | England et al. | |
| 6,338,044 B1 | 1/2002 | Cook et al. | |
| 6,341,353 B1 | 1/2002 | Herman et al. | |
| 6,345,256 B1 | 2/2002 | Milsted | |
| 6,363,486 B1 | 3/2002 | Knapton, III | |
| 6,363,488 B1 | 3/2002 | Ginter et al. | |
| 6,385,596 B1 | 5/2002 | Wiser et al. | |
| 6,389,592 B1 | 5/2002 | Ayres et al. | |
| 6,546,555 B1 | 4/2003 | Hjelsvold et al. | |
| 6,549,922 B1 | 4/2003 | Srivastava et al. | |
| 6,587,837 B1 | 7/2003 | Spagna et al. | |
| 6,591,420 B1 | 7/2003 | McPherson et al. | |
| 6,658,476 B1 | 12/2003 | Van | |
| 6,691,149 B1 | 2/2004 | Yokota et al. | |
| 6,731,312 B2 | 5/2004 | Robbin | |
| 6,754,895 B1 | 6/2004 | Bartel et al. | |
| 6,873,992 B1 | 3/2005 | Thomas | |
| 6,874,003 B2 | 3/2005 | Morohashi | |
| 6,910,049 B2 | 6/2005 | Fenton et al. | |
| 6,938,005 B2 | 8/2005 | Iverson et al. | |
| 7,073,193 B2 | 7/2006 | Marsh | |
| 7,076,445 B1 | 7/2006 | Cartwright | |
| 7,168,012 B2 | 1/2007 | Clauss et al. | |
| 7,209,892 B1 | 4/2007 | Galuten et al. | |
| 7,275,243 B2 | 9/2007 | Gibbons et al. | |
| 7,292,980 B1 | 11/2007 | August et al. | |
| 7,308,413 B1 | 12/2007 | Tota et al. | |
| 7,383,233 B1 | 6/2008 | Singh et al. | |
| 7,624,046 B2 | 11/2009 | Galuten et al. | |
| 7,657,524 B1 * | 2/2010 | Laursen | G06F 17/241 |
| | | | 707/999.006 |
| 7,685,512 B2 | 3/2010 | Hanson et al. | |
| 7,729,946 B2 | 6/2010 | Chu | |
| 7,739,256 B2 | 6/2010 | Powell | |
| 7,756,920 B2 | 7/2010 | Muller et al. | |
| 7,827,162 B2 | 11/2010 | Suitts et al. | |
| 7,844,548 B2 | 11/2010 | Robbin et al. | |
| 7,860,830 B2 | 12/2010 | Mirrashidi et al. | |
| 7,962,634 B2 | 6/2011 | Cortos et al. | |
| 8,015,237 B2 | 9/2011 | Muller | |
| 2001/0021926 A1 | 9/2001 | Schneck et al. | |
| 2001/0037207 A1 | 11/2001 | Dejaeger | |
| 2001/0044786 A1 | 11/2001 | Ishibashi | |
| 2001/0054046 A1 | 12/2001 | Mikhailov et al. | |
| 2002/0002541 A1 | 1/2002 | Williams | |
| 2002/0004824 A1 | 1/2002 | Cuan et al. | |
| 2002/0032658 A1 | 3/2002 | Oki et al. | |
| 2002/0047899 A1 | 4/2002 | Son et al. | |
| 2002/0049844 A1 | 4/2002 | Nishikawa | |
| 2002/0073177 A1 | 6/2002 | Clark et al. | |
| 2002/0077986 A1 | 6/2002 | Kobata et al. | |
| 2002/0078211 A1 | 6/2002 | Natarajan et al. | |
| 2002/0082857 A1 | 6/2002 | Skordin et al. | |
| 2002/0087440 A1 | 7/2002 | Blair et al. | |
| 2002/0091584 A1 | 7/2002 | Clark et al. | |
| 2002/0099661 A1 | 7/2002 | Kii et al. | |
| 2002/0099696 A1 | 7/2002 | Prince | |
| 2002/0099801 A1 | 7/2002 | Ishii | |
| 2002/0107803 A1 | 8/2002 | Lisanke et al. | |
| 2002/0112171 A1 | 8/2002 | Ginter et al. | |
| 2002/0116293 A1 | 8/2002 | Lao et al. | |
| 2002/0124182 A1 | 9/2002 | Basco et al. | |
| 2002/0143612 A1 | 10/2002 | Barik et al. | |
| 2002/0143782 A1 | 10/2002 | Headings et al. | |
| 2002/0152267 A1 | 10/2002 | Lennon | |
| 2002/0152278 A1 | 10/2002 | Pontenzone et al. | |
| 2002/0165811 A1 | 11/2002 | Ishii et al. | |
| 2002/0186844 A1 | 12/2002 | Levy et al. | |
| 2002/0198843 A1 | 12/2002 | Wang et al. | |
| 2003/0005173 A1 | 1/2003 | Shah et al. | |
| 2003/0033162 A1 | 2/2003 | Houssiaux et al. | |
| 2003/0037242 A1 | 2/2003 | Yasuna et al. | |
| 2003/0065717 A1 | 4/2003 | Saito et al. | |
| 2003/0074465 A1 | 4/2003 | Tang et al. | |
| 2003/0115144 A1 | 6/2003 | Stefik et al. | |
| 2003/0120593 A1 | 6/2003 | Bansal et al. | |
| 2003/0120928 A1 | 6/2003 | Cato et al. | |
| 2003/0135424 A1 | 7/2003 | Davis et al. | |
| 2003/0149742 A1 | 8/2003 | Bollerud | |
| 2003/0182188 A1 | 9/2003 | Duchow | |
| 2003/0208473 A1 | 11/2003 | Lennon | |
| 2003/0226150 A1 | 12/2003 | Berberet et al. | |
| 2003/0236886 A1 | 12/2003 | Oren et al. | |
| 2004/0012618 A1 | 1/2004 | Finney et al. | |
| 2004/0015427 A1 | 1/2004 | Camelio | |
| 2004/0015445 A1 | 1/2004 | Heaven et al. | |
| 2004/0034601 A1 | 2/2004 | Kreuzer | |
| 2004/0039754 A1 | 2/2004 | Harple | |
| 2004/0044949 A1 | 3/2004 | Rowe | |
| 2004/0059929 A1 | 3/2004 | Rodgers et al. | |
| 2004/0133605 A1 | 7/2004 | Chang et al. | |
| 2004/0136698 A1 | 7/2004 | Mock | |
| 2004/0143760 A1 | 7/2004 | Alkove et al. | |
| 2004/0148598 A1 | 7/2004 | Kita et al. | |
| 2004/0153968 A1 | 8/2004 | Ching et al. | |
| 2004/0167858 A1 | 8/2004 | Erickson | |
| 2004/0181459 A1 | 9/2004 | Wright | |
| 2004/0205028 A1 | 10/2004 | Verosub et al. | |
| 2004/0210481 A1 | 10/2004 | Quinlan et al. | |
| 2004/0215733 A1 | 10/2004 | Gondhalekar et al. | |
| 2004/0254883 A1 | 12/2004 | Kondrik et al. | |
| 2004/0254949 A1 | 12/2004 | Amirthalingam | |
| 2004/0267552 A1 | 12/2004 | Gilliam et al. | |
| 2004/0267608 A1 | 12/2004 | Mansfield, Jr. et al. | |
| 2004/0268451 A1 | 12/2004 | Robbin et al. | |
| 2005/0015765 A1 | 1/2005 | Covell et al. | |
| 2005/0021478 A1 | 1/2005 | Gautier et al. | |
| 2005/0034164 A1 | 2/2005 | Sano et al. | |
| 2005/0038813 A1 | 2/2005 | Apparao et al. | |
| 2005/0050218 A1 | 3/2005 | Sheldon et al. | |
| 2005/0050345 A1 | 3/2005 | Dowdy et al. | |
| 2005/0071418 A1 | 3/2005 | Kjellberg et al. | |
| 2005/0080743 A1 | 4/2005 | Ostrover et al. | |
| 2005/0080788 A1 | 4/2005 | Murata et al. | |
| 2005/0144635 A1 | 6/2005 | Boortz | |
| 2005/0165656 A1 | 7/2005 | Frederick et al. | |
| 2005/0182792 A1 | 8/2005 | Israel et al. | |
| 2005/0197946 A1 | 9/2005 | Williams et al. | |
| 2005/0216472 A1 | 9/2005 | Leon et al. | |
| 2005/0240529 A1 | 10/2005 | Thomas | |
| 2005/0246159 A1 | 11/2005 | Perla et al. | |
| 2005/0267894 A1 | 12/2005 | Camahan | |
| 2005/0278375 A1 | 12/2005 | Mitchko | |
| 2005/0283394 A1 | 12/2005 | McGloin et al. | |
| 2006/0008256 A1 | 1/2006 | Khedouri et al. | |
| 2006/0015489 A1 | 1/2006 | Probst et al. | |
| 2006/0041748 A1 | 2/2006 | Lockhart et al. | |
| 2006/0048132 A1 | 3/2006 | Chen | |
| 2006/0062426 A1 | 3/2006 | Levy et al. | |
| 2006/0074754 A1 | 4/2006 | Toyohara et al. | |
| 2006/0107046 A1 | 5/2006 | Raley et al. | |
| 2006/0112101 A1 | 5/2006 | Young | |
| 2006/0143264 A1 | 6/2006 | Payne et al. | |
| 2006/0161604 A1 | 7/2006 | Lobo | |

(56) References Cited

U.S. PATENT DOCUMENTS

| | | |
|---|---|---|
| 2006/0167751 A1 | 7/2006 | Maruyama |
| 2006/0167816 A1 | 7/2006 | Wang et al. |
| 2006/0212722 A1 | 9/2006 | Ginter et al. |
| 2006/0229929 A1 | 10/2006 | Hughes |
| 2006/0229941 A1 | 10/2006 | Gupta |
| 2006/0242640 A1 | 10/2006 | Pauly et al. |
| 2006/0272026 A1 | 11/2006 | Niwano et al. |
| 2006/0277096 A1 | 12/2006 | Levitus |
| 2006/0287966 A1 | 12/2006 | Srinivasaraghavan et al. |
| 2007/0011156 A1 | 1/2007 | Maron |
| 2007/0011178 A1 | 1/2007 | Dumitru et al. |
| 2007/0011709 A1 | 1/2007 | Katz et al. |
| 2007/0028269 A1 | 2/2007 | Nezu et al. |
| 2007/0033531 A1 | 2/2007 | Marsh |
| 2007/0050467 A1 | 3/2007 | Borrett et al. |
| 2007/0073694 A1 | 3/2007 | Picault |
| 2007/0083471 A1 | 4/2007 | Robbin et al. |
| 2007/0106522 A1 | 5/2007 | Collins et al. |
| 2007/0108274 A1 | 5/2007 | Boardman et al. |
| 2007/0192352 A1 | 8/2007 | Levy |
| 2007/0208670 A1 | 9/2007 | Quoc |
| 2007/0220051 A1 | 9/2007 | Brentano et al. |
| 2007/0261088 A1 | 11/2007 | Phillips et al. |
| 2007/0265969 A1 | 11/2007 | Horwat et al. |
| 2007/0266028 A1 | 11/2007 | Muller et al. |
| 2007/0266047 A1 | 11/2007 | Cortes et al. |
| 2008/0040379 A1 | 2/2008 | Suitts et al. |
| 2008/0071614 A1 | 3/2008 | Mebruer |
| 2008/0077850 A1 | 3/2008 | Gauthier et al. |
| 2008/0120199 A1 | 5/2008 | Pirnack et al. |
| 2008/0133594 A1 | 6/2008 | Fotinatos et al. |
| 2008/0140493 A1 | 6/2008 | DeAngelis |
| 2008/0140537 A1 | 6/2008 | Powell et al. |
| 2008/0147530 A1 | 6/2008 | Kwan et al. |
| 2008/0147558 A1 | 6/2008 | Kraus |
| 2008/0155552 A1 | 6/2008 | Kim |
| 2008/0195651 A1 | 8/2008 | Rachmiel et al. |
| 2008/0249946 A1 | 10/2008 | Candelore |
| 2008/0288405 A1 | 11/2008 | John |
| 2008/0301058 A1 | 12/2008 | Campbell et al. |
| 2009/0037287 A1 | 2/2009 | Baitalmal et al. |
| 2009/0063543 A1 | 3/2009 | Martin et al. |
| 2009/0138117 A1 | 5/2009 | Bagwell et al. |
| 2009/0198830 A1 | 8/2009 | Zhang et al. |
| 2009/0240552 A1 | 9/2009 | Yang et al. |
| 2009/0259502 A1 | 10/2009 | Erlewine et al. |
| 2009/0260060 A1 | 10/2009 | Smith et al. |
| 2009/0276332 A1 | 11/2009 | Gharabally et al. |
| 2009/0276333 A1 | 11/2009 | Cortes et al. |
| 2009/0276433 A1 | 11/2009 | Fosback et al. |
| 2009/0307201 A1 | 12/2009 | Dunning et al. |
| 2009/0307682 A1 | 12/2009 | Gharabally et al. |
| 2009/0307683 A1 | 12/2009 | Gharabally |
| 2010/0114739 A1 | 5/2010 | Johnston |
| 2010/0115443 A1 | 5/2010 | Richstein |
| 2010/0205274 A1 | 8/2010 | Gharabally et al. |
| 2010/0235254 A1 | 9/2010 | Mirrashidi et al. |
| 2010/0235889 A1 | 9/2010 | Chu et al. |
| 2010/0251099 A1 | 9/2010 | Makower et al. |
| 2010/0299219 A1 | 11/2010 | Cortes et al. |
| 2011/0023001 A1 | 1/2011 | Giffel |
| 2011/0035579 A1 | 2/2011 | Miura et al. |
| 2011/0060776 A1 | 3/2011 | Suitts et al. |
| 2011/0086591 A1* | 4/2011 | Neal ............... H04H 20/40 455/3.06 |
| 2011/0246386 A9 | 10/2011 | Keenan et al. |
| 2011/0289213 A1 | 11/2011 | Brown et al. |
| 2012/0023015 A1 | 1/2012 | Mathai et al. |
| 2012/0271893 A1* | 10/2012 | Ott, IV ............ G06F 17/30053 709/206 |

FOREIGN PATENT DOCUMENTS

| | | |
|---|---|---|
| JP | 2002/041482 | 2/2002 |
| JP | 2006/272000 | 10/2006 |
| JP | 2008/142548 | 6/2008 |
| JP | 2009/048340 | 3/2009 |
| WO | 97/04410 | 2/1997 |
| WO | 98/49644 | 11/1998 |
| WO | 00/08909 | 2/2000 |
| WO | 02/48920 | 6/2002 |
| WO | 2004/019182 | 3/2004 |

OTHER PUBLICATIONS

"Digital Audio Best Practices Version 2.1," by Digital Audio Working Group, Oct. 2006, http:/www.mndigital.org.digitizing/standards/audio.pdf.

"Gracenote CDDB," Gracenote, product webpage, http://www.gracenote.com/gn_products/cddb.html, downloaded Oct. 7, 2003, pp. 1-2.

"Gracenote MusicID," Gracenotem product webpage, http://www.gracenote.com/gn_products/cddb.html, downloaded Oct. 7, 2003, pp. 1-2.

"Media Encoding FAQ," Loudeye Corp., http://loudeye.com/digitalmedia/solutions/mediaenchost/encodingfaq.asp, downloaded Oct. 9, 2003, pp. 1-3.

"Media Encoding," Loudeye Corp., http://www.loudeye.com/digitalmedia/solutions/mediaenchost/encoding,aso, downloaded Oct. 9, 2003, pp. 1-4.

"Media Hosting," Loudeye Corp., http://www.loudeye.com/digitalmedia/solutions/mediaenchost/hosting.asp, downloaded Oct. 9, 2003, pp. 1-2.

MPEG-7 Multimedia Description Schemes XM (Version 2.0). ISO/IEC, Mar. 2000, pp. 1-138.

"Music Collector Features," Collectorz.com music collector features, http://www.collectorz.com/music/features.php, downloaded Oct. 7, 2003, pp. 1-2.

"Preview and Convera Announce Availability of Digital Media Commerce Platform for Secure Digital Audio Devices," Convera Press release, Las Vegas, NV, Consumer Electronics Show, Jan. 8, 2001, pp. 1-3.

"Radified Guide to Ripping & Encoding CD Audio," http://mp3.radified.com, downloaded Oct. 7, 2003, pp. 1-5.

"Sono Press Global Network User Manual: Client Tools, Upload Data/Graphics Files to Sonopress," Sonopress, date unknown.

Jyri Huopaniemi, "Music Encoding and Transmission," CUIDAD meeting, ICMC 2000 Berlin, Aug. 28, 2000.

"Liquifier Pro 4.0 for Windows TM User's Guide," 1998, Liquid Audio, Inc., 1998.

* cited by examiner

MIGRATION OF FEEDBACK DATA TO EQUIVALENT DIGITAL ASSETS

CROSS-REFERENCE TO RELATED APPLICATIONS

This application is a Continuation of and claims the benefit of U.S. patent application Ser. No. 13/740,031, filed on Jan. 11, 2013 entitled "Migration of Feedback Data to Equivalent Digital Assets," which is expressly incorporated by reference herein in its entirety.

BACKGROUND

Today, online stores, such as the iTunes™ Store provided by Apple Inc. of Cupertino, Calif., allow customers (i.e., online users) via the Internet to purchase or rent media items (such as music, videos) or software programs. Often, at online stores, numerous digital items are made available and are provided by various different providers, such as music labels, movie companies, and application developers. Software tools, such as iProducer™ and iTunes Connect™ available from Apple Inc., can assist providers with online submission of digital items to the iTunes™ Store.

Since submission involves transmission of digital files over the Internet to online stores for distribution, the submission process can be time consuming to a submitter. When the digital files are large or voluminous, the transmission of the digital files for the submission can take a substantial duration of time. The digital files pertain to digital assets. After the submission, if quality checks are satisfied, the digital assets can be available for distribution. Once available for distribution, the digital assets (e.g., media item(s)) can receive feedback from users, such as purchasers or users of the digital assets. This feedback is associated with a particular digital asset to which it was directed. With numerous users providing feedback data, reliable feedback data can be acquired and used to determine and present popularity data, charts, reviews, etc. The feedback data can be accumulated over time and also older feedback data can be decayed over time, so that the feedback data remains not only reliable but current.

When a digital asset that was previously submitted and distributed is removed from distribution due to errors, upgrades or corrections, the digital asset becomes no longer available. Often, in such cases, a replacement digital asset is submitted for distribution in place of the previously submitted and now removed digital asset. Indeed, the replacement digital asset is often considered in the content provider's eyes as an upgraded version of the previous digital asset. Unfortunately, however, the removal of the previous digital asset causes its feedback data to be removed. As a result, the feedback data for the previous data is lost. Consequently, there is a need for improved approaches to manage feedback data for digital assets that are submitted but then removed and resubmitted in an altered manner.

SUMMARY

The invention pertains to methods and systems for migrating feedback data from one digital asset to another digital asset. Typically, the one digital asset is available for distribution from a network-based media distribution system, but then subsequently is removed from distribution for any of a number of reasons. However, since the one digital asset has been in use at the network-based media distribution system, it has accumulated feedback data. Hence, if the another digital asset serves (e.g., due to equivalency) to replace the one digital asset, then the accumulated feedback data from the one digital asset can be transferred to the another digital asset. As a result, the another digital asset can benefit from the feedback data that was previously associated with the one digital assert.

The digital assets can, for example, pertain to digital media assets such as audio assets (e.g., songs, albums, podcasts, or audiobooks) or video assets (e.g., movies or television shows). The feedback data for the digital assets can pertain to one or more popularity data, rating data or review data.

Embodiments of the invention can be implemented in numerous ways, including as a method, system, device, or apparatus (including graphical user interface and computer readable medium). Several embodiments of the invention are discussed below.

As a method for migrating feedback data between digital assets, one embodiment can, for example, include at least: storing feedback data for a plurality of digital assets; determining that a prior digital asset of the plurality of digital assets has been replaced by a replacement digital asset; and associating the feedback data previously associated with the prior digital asset to the replacement digital asset.

As a method for transferring feedback data between digital media assets, one embodiment can, for example, include at least: permitting online distribution of a digital media asset; subsequently determining that the digital media asset is no longer available for distribution; determining a set of potential replacement digital media assets for the digital media asset; selecting a replacement digital media asset from the set of potential replacement digital media assets; and assigning feedback data associated with the digital media asset to the replacement digital media asset.

As a computer readable medium including at least computer program code for transferring feedback data between digital media assets, one embodiment can, for example, include at least: computer program code for permitting online distribution of a digital media asset; computer program code for subsequently determining that the digital media asset is no longer available for distribution; computer program code for accessing feedback data associated with the digital media asset; computer program code for determining a set of potential replacement digital media assets for the digital media asset; computer program code for selecting a replacement digital media asset from the set of potential replacement digital media assets; and computer program code for assigning the feedback data associated with the digital media asset to the replacement digital media asset.

As a system for managing feedback data for a plurality of digital assets that are available for playback or distribution, one embodiment can, for example, include at least: a media asset database configured to store digital data for the plurality of digital assets; a feedback database configured to store the feedback data for the plurality of digital assets; and a feedback migration manager configured to at least (i) determine that a prior digital asset of the plurality of digital assets has been replaced by a replacement digital asset, and (ii) update the feedback database to associate the feedback data previously associated with the prior digital asset to the replacement digital asset, provided that it is determined that the prior digital asset of the plurality of digital assets has been replaced by a replacement digital asset.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

The invention pertains to methods and systems for migrating feedback data from one digital asset to another digital asset. Typically, the one digital asset is available for distribution from a network-based media distribution system, but then subsequently is removed from distribution for any of a number of reasons. However, since the one digital asset has been in use at the network-based media distribution system, it has accumulated feedback data. Hence, if the another digital asset serves (e.g., due to equivalency) to replace the one digital asset, then the accumulated feedback data from the one digital asset can be transferred to the another digital asset. As a result, the another digital asset can benefit from the feedback data that was previously associated with the one digital assert.

The digital assets can, for example, pertain to digital media assets such as audio assets (e.g., songs, albums, podcasts, or audiobooks) or video assets (e.g., movies or television shows). The feedback data for the digital assets can pertain to one or more of popularity data, rating data or review data.

The various aspects, features, embodiments or implementations of the invention described above can be used alone or in various combinations.

Embodiments of various aspects of the invention are discussed below with reference to FIGS. 1A-5. However, those skilled in the art will readily appreciate that the detailed description given herein with respect to these figures is for explanatory purposes as the invention extends beyond these limited embodiments.

Figure 1A:
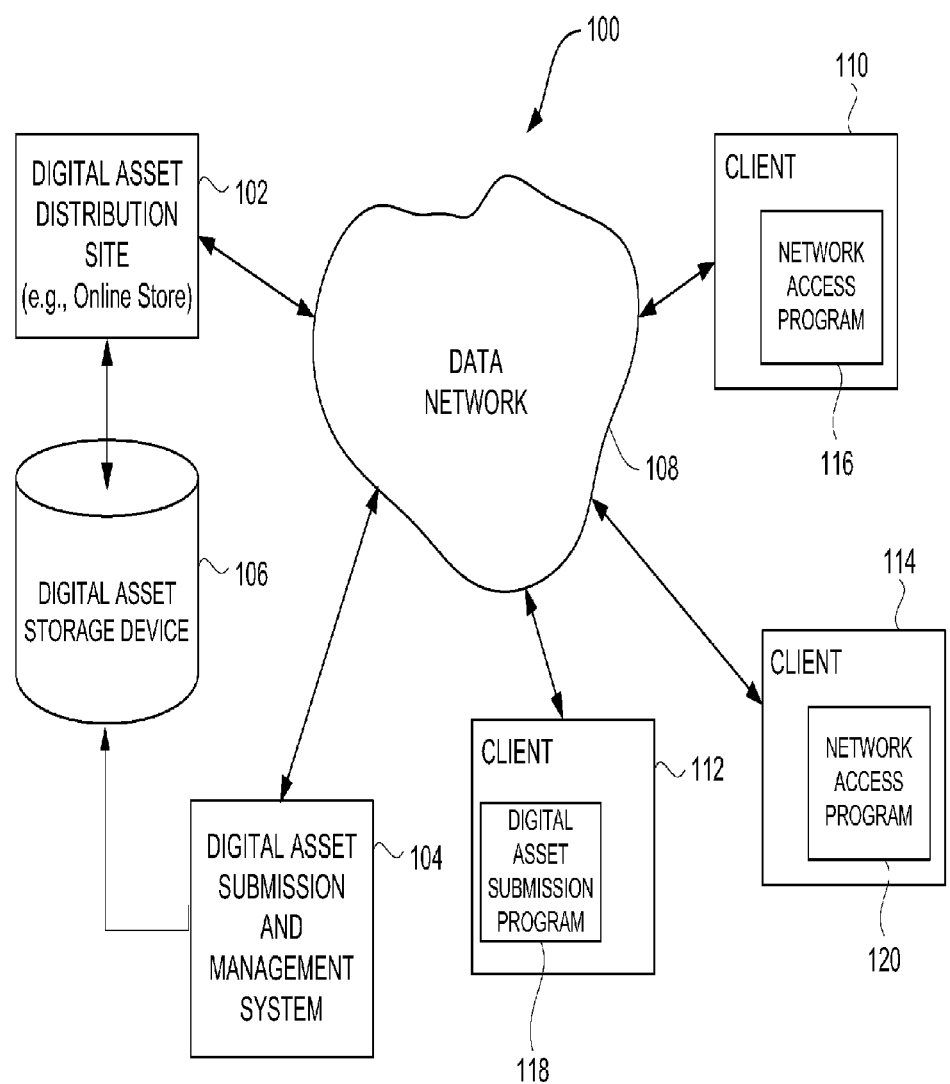
FIG. 1A illustrates a block diagram of a digital asset submission and distribution system according to one embodiment.

FIG. 1A illustrates a block diagram of a digital asset submission and distribution system 100 according to one embodiment. The digital asset submission and distribution system 100 includes a digital asset distribution site 102. The digital asset distribution site 102 provides an online access point for distribution of various digital assets. For example, the digital asset distribution site 102 can be referred to as an online store. A digital asset submission and management system 104 operates to receive submissions of digital assets from various digital asset submitters. The digital asset submission and management system 104 can process submission of digital assets and authorize distribution of approved digital assets. The digital assets can be stored in a digital asset storage device 106. In one embodiment, the digital asset storage device 106 includes a mass data store and one or more databases. The digital asset storage device 106 provides mass storage of the numerous digital assets that are available for distribution (e.g., purchase or rental). For example, digital assets that have been purchased can be accessed from the digital asset storage device 106 over a data network 108 by way of the digital asset distribution site 102. Examples of digital assets include digital media assets (e.g., media items) or computer program products. Digital media assets can pertain to audio (e.g., songs, albums, podcasts, or audiobooks) or video (e.g., movies or television shows). Computer program products can pertain to applications (or application programs), animations, or presentations.

The digital asset submission and distribution system 100 also includes a first client 110, a second client 112 and a third client 114. Typically, the digital asset submission and distribution system 100 would include a plurality of different clients, such as the clients 110, 112, 114. The first client 110 can include a network access program 116. The second client 112 can include a digital asset submission program 118. The third client 114 can include a network access program 120. Some clients can also include both the network access program 116 and the digital asset submission program 118. The network access program 116 is an application program (e.g., software application) that operates on the first client 110, which is a computing device. The network access program 120 is an application program (e.g., software application) that operates on the third client 114, which is a computing device. One example of a suitable network access program is a network browser (e.g., Microsoft Explorer™ or Safari™). Another example of a suitable network access program is iTunes™ offered by Apple Inc. The first client 110 is coupled to the digital asset distribution site 102 through the data network 108. Hence, the first client 110 can interact with the digital asset distribution site 102 to review, purchase and/or manage digital assets.

The digital asset submission program 118 is also an application program (e.g., software application) that operates on the second client 112, which is a computing device. The digital asset submission program 118 is used to submit digital assets to the digital asset submission and management system 104 for eventual distribution by the media distribution site 102. Although the network access program 116 and the digital asset submission program 118 are shown in FIG. 1A as separate programs, it should be understood that such programs can be integrated into a single program or reside on the same client machine.

In the digital asset submission and distribution system 100 shown in FIG. 1A, the digital assets are submitted to the digital asset submission and management system 104 by way of the digital asset submission program 118. The digital assets that have been submitted (e.g., via the second client 112) are processed and then stored in the digital asset storage device 106. The stored digital assets can then undergo some processing, such as an encoding, so that the format of the stored digital assets is uniform and suitable for distribution.

Thereafter, the stored digital assets can be made available for purchase from the digital asset distribution site 102. Upon purchasing a particular digital asset, the digital asset distribution site 102 permits the digital data for the particular digital asset to be retrieved from the digital asset storage device 106 and then delivered (e.g., downloaded) from the digital asset distribution site 102 to the requesting client 110 through the data network 108. In this regard, the digital asset distribution site 102 or some other delivery server (not shown) obtains the digital data corresponding to the particular digital asset from the digital asset storage device 106 and downloads such digital data through the data network 108 to the client 110. The downloaded digital data can then be stored on the client 110. In one embodiment, the downloaded digital data is encrypted as received at the client 110 but is decrypted and then perhaps re-encrypted before persistently stored on the client 110. Thereafter, the client 110 can utilize (e.g., execute) the digital data of the digital asset at the client 110.

The digital asset submission and distribution system 100 allows a user of the client 110 to utilize the network access program 116, 120 to browse, search or sort through a plurality of digital assets that can be purchased from the digital asset distribution site 102. The network access program 116, 120 may allow the user to preview or demo some or all of a digital asset. In the event that the user of the network access program 116, 120 desires to purchase a particular digital asset, the user (via the network access program 116, 120) and the digital asset distribution site 102 can engage in an online commerce transaction in which the user pays for access rights to the particular digital asset. The network access program 116, 120 may also allow the user to provide feedback data for digital assets (e.g., digital assets that are played, purchased or otherwise used). The feedback data can be used to rank, chart or rate digital assets.

The submission and purchase of the digital assets can be achieved over the data network 108. In other words, the submission and purchase of the digital assets can be achieved online. The purchase of media items online can also be referred to as electronic commerce (e-commerce). In one embodiment, the data network 108 includes at least a portion of the Internet. The clients 110, 112, 114 can vary with application but generally are computing devices that have memory storage. Often, the clients 110, 112, 114 are personal computers or other computing devices that are capable of storing and presenting media to their users. In one embodiment, the connections through the data network 108 between the digital asset distribution site 102 and the clients 110, 112, 114 can be through secure connections, such as Secure Sockets Layer (SSL).

Although the digital asset distribution site 102, the digital asset submission and management system 104 and the digital asset storage device 106 are shown in FIG. 1A as being separate components, it should be understood that any of these components can be combined into one or more apparatus. For example, the digital asset submission and management system 104 can be incorporated into the digital asset distribution site 102. As another example, the digital asset storage device 106 can be incorporated into the digital asset distribution site 102 or the digital asset submission and management system 104.

The client (or client device) can, for example, be a computing device. Examples of a computing device include a personal computer (e.g., desktop computer, notebook computer or netbook computer), or a portable handheld electronic device (e.g., Portable Digital Assistant (PDA), multi-function mobile telephone).

Figure 1B:
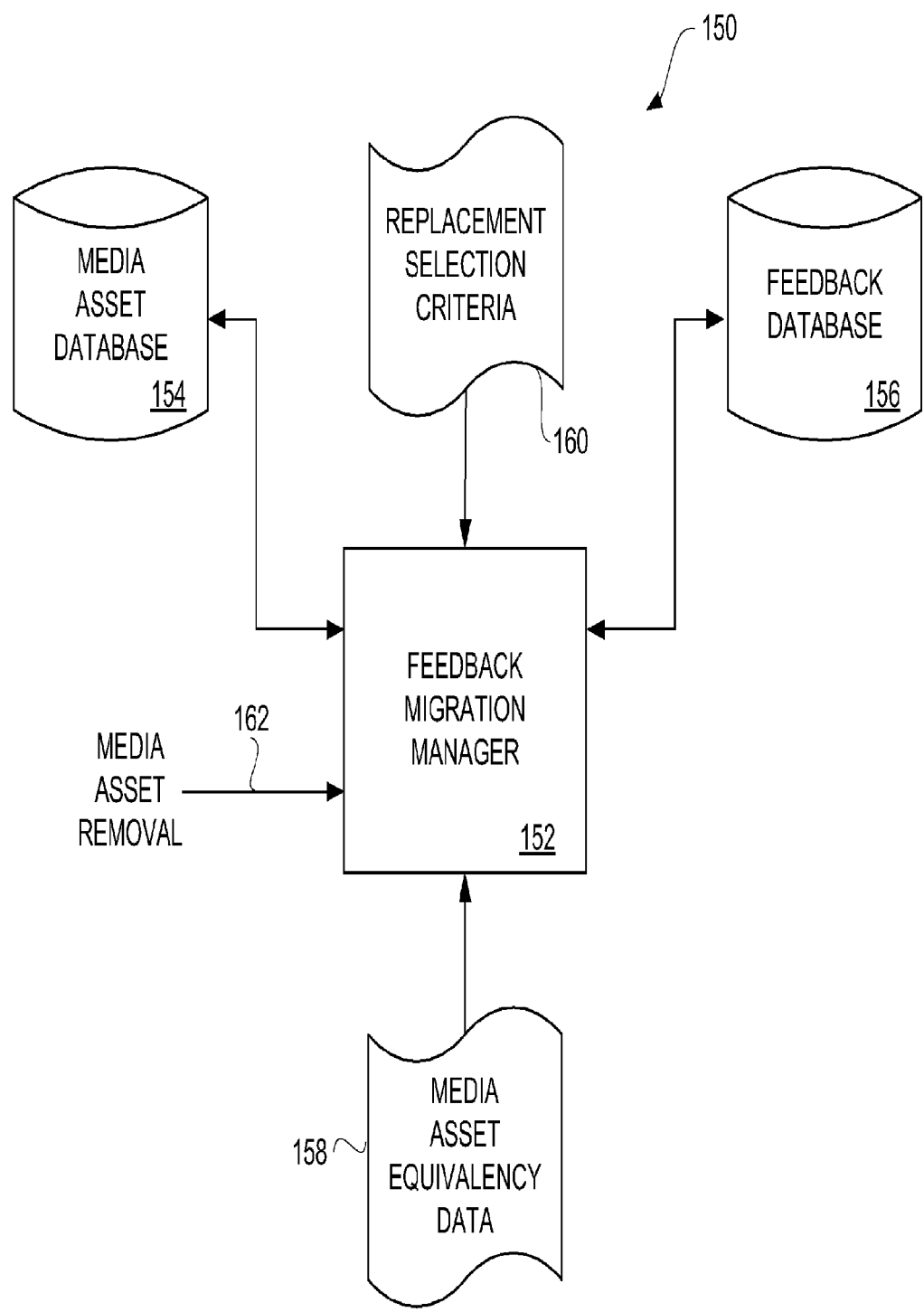
FIG. 1B is a block diagram of a feedback management system according to one embodiment.

FIG. 1B is a block diagram of a feedback management system 150 according to one embodiment. The feedback management system 150 can represent a portion of the digital asset submission and management system 104 illustrated in FIG. 1A. That is, the digital asset submission and management system 104 can provide management of digital assets, such as media assets, that have been submitted, resubmitted, purchased and/or evaluated by or for users.

The feedback management system 150 illustrated in FIG. 1B includes a feedback migration manager 152 that manages the migration of feedback data from one media asset to another media asset. Typically, the feedback data is migrated when an active media asset is later deactivated and replaced by another active media asset. For example, users can provide direct or indirect feedback data that can be used to rank, chart or rate such media assets.

The feedback management system 150 also includes a media asset database 154 and a feedback database 156. The media asset database 154 can store at least descriptive information (e.g. metadata) for each of a plurality of media assets. The feedback database 156 can store feedback data for a plurality of media assets. The feedback data for the digital assets (or media assets) can be provided by a user (or purchaser) of the associated digital asset. As noted above, the feedback data can pertain to popularity data, rating data or review data. The media asset database 154 and the feedback database 156 can be linked to associate with corresponding media assets. Alternatively, the media asset database 154 and the feedback database 156 can be integrated into a common database. Media content for each of the plurality of media assets can be stored in a storage device (e.g., digital asset storage device 106).

Still further, the feedback management system 150 can also include or receive media asset equivalency data 158. The media asset equivalency data 158 can be derived from data associated with the plurality of media assets, such as data (e.g., metadata (e.g., metadata and other descriptive data) provided upon their submission to the media management system 100. Equivalency can be determined using metadata, electronic signatures or audio signatures. The media asset equivalency data 158 can include data that identifies one or more potential equivalent media assets for a given media asset. The feedback migration manager 152 can utilize the media asset equivalency data 158 to determine an appropriate equivalent media asset to be associated with the feedback data that is being migrated.

The feedback management system 150 can also include or receive replacement selection criteria 160. The replacement selection criteria 160 pertains to one or more rules that can be utilized by the feedback migration manager 152 to select an equivalent media asset to be the recipient of the migrated feedback data. The selected equivalent media asset is selected from the one or more potential equivalent media assets identified by the media asset equivalency data 158.

During operation, the feedback management system 150 can be notified of a media asset removal 162. The digital asset submission and management system 104 typically monitors and manages addition and removal of media assets, and can thus notify the feedback management system 150 of the media asset removal 163. The removal of a media asset can be initiated by a user or by the system itself. In response to the media asset removal 162, the feedback migration manager 152 determines an appropriate equivalent media asset, if any, that can be the beneficiary of feedback data previously established for the media item now being or recently removed. In this regard, the feedback migration manager 152 can access the media asset equivalency data 158 to identify a set of potential equivalent media assets that can be considered as recipients. In this regard, the feedback migration manager 152, makes use of the replacement selection criteria 160 to determine a selected one of the equivalent media assets that have been identified by the media asset equivalency data 158. After the selection of one of the equivalent media assets has been performed, the feedback migration manager 152 can interact with the feedback database 156 to associate the previously established feedback data for the media asset being removed to the selected one of the equivalent media assets. Additionally, the feedback migration manager 152 can also be unassociated the previously established feedback data from the media asset that has been removed. Hence, the feedback data can be transferred to the selected on of the equivalent media assets and thus is no longer associated with the removed media asset.

Advantageously, through migration of feedback data, resubmission of media assets (e.g., due to minor informalities or adjustments) can be performed without detrimentally impacting previously acquired feedback data.

The media asset equivalency data 158 can take a wide range of different formats. In one embodiment, the media asset equivalency data 158 can provide equivalency data in one or more predetermined data structures stored to one or more electronic files. The equivalency data can be periodically recreated such that it remains current.

As one example, in the case where the media assets are songs (such as singles or Extended Play (EP) items), the predetermined data structure can serve to identify a set of equivalent media assets (that are songs) for each of such songs. As a specific example, the predetermined data structure that identifies equivalent songs can have the following data structure:

474385969c,4632|457510741eM,4632; 417849042,324, 16

The explanation of the data structure is as follows:
474385969=source song identifier (ID)
c=indicates the source song has a "Clean" parental advisory flag [i.e., not explicit]
4632=content provider identifier (ID) of source song
|=break between source song and equivalent songs
457510741=is the source song identifier (ID) for equivalent song #1
e=song has "Explicit" parental advisory flag
M=song has its "Mastered for iTunes" flag set to true (meaning the song file is encoded for high quality usage with iTunes)
4632=equivalent song's content provider identifier (ID)
;=break between each equivalent song information
417849042=is the source song identifier (ID) for equivalent song #2
No 'c' or 'e' means the parental advisory is null or 'Blank' for the song
No 'M' means the song (and it's playlist) is not "Mastered for iTunes"
324=equivalent song's content provider identifier (ID)
16=subsumed by content provider means that at one point the content provider ID was 16, but content provider ID 324 subsumed it and is now the current content provider.

As another example, in the case where the media assets are playlists (such as albums), the predetermined data structure can serve to identify a set of equivalent media assets (that are playlists) for each of such playlists. As a specific example, the predetermined data structure that identifies equivalent playlists can have the following data structure:

123eM,188,3:456,540|1122e,188:2233,541;1133,189: 2233c,541,3

Figure 2:
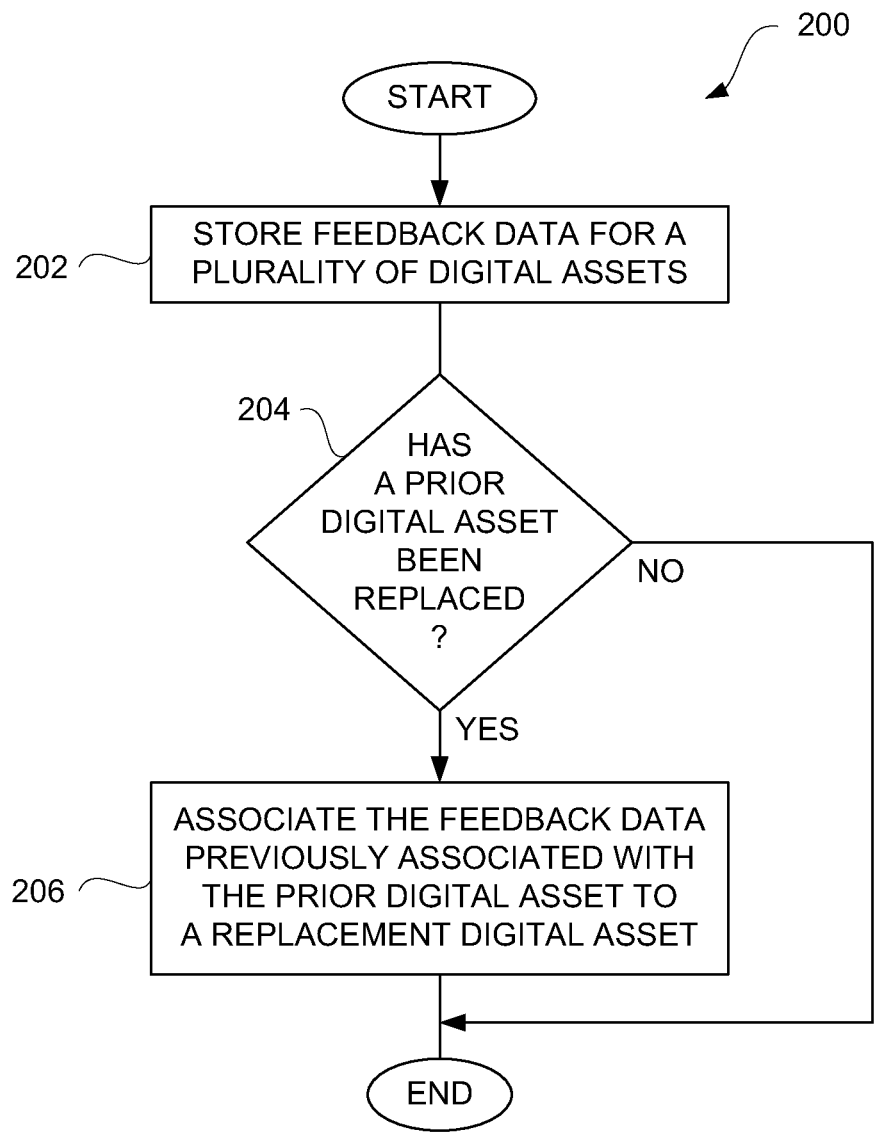
FIG. 2 is a flow diagram of a feedback association process according to one embodiment.

The explanation of the data structure is as follows:
:=separates two playlists
123 and 456 are playlist identifiers (IDs)
e—appended after playlist ID or song ID indicates that playlist/song is explicit
M—appended after playlist ID or song ID indicates that playlist/song is mastered for iTunes
188,3=content provider for playlist 123 subsumed by family
540=content provider for playlist 456 subsumed by family
|=break separating playlist and song data
1122e and 2233 are matching song identifiers (IDs)
188=content provider for song 1122e subsumed by family
541=content provider for song 2233 subsumed by family
;=separates pairs of matching songs
1133 and 2233c are matching song identifiers (IDs)
189=content provider for song 1133 subsumed by family
541,3=content provider for song 2233c subsumed by family FIG. 2 is a flow diagram of a feedback association process 200 according to one embodiment. The feedback association process 200 can, for example, performed by the digital asset submission and management system 104 illustrated in FIG. 1A or the feedback migration manager 152 illustrated in FIG. 1B.

The feedback association process 200 can store 202 feedback data for a plurality of digital assets. The feedback can concern popularity, ratings or reviews. The feedback data can also be updated periodically so that it remains current. The feedback data can be used in charting or ranking the plurality of digital assets. Typically, the feedback data is directly or indirectly associated with feedback provided by users (or purchasers) of the plurality of digital assets. The feedback data may be absolute data or may be accumulated data.

Besides storing 202 the feedback data for the plurality of digital assets, the feedback association process 200 can include a decision 204 that determines whether a prior digital asset has been replaced. Here, it should be understood that the availability of a particular digital asset from an online media system can change over time. The particular digital asset can be removed from the online media system for a variety of reasons, and its removal can be initiated by a user or by the system itself. The removed digital asset may also be replaced with a replacement digital asset that it intended to supersede the removed digital asset. For example, a particular digital asset that has been available from an online media system might be removed and replaced by essentially the same digital asset but with some improvement, such as an improved quality (e.g., encoding). As another example, a particular digital asset might be removed and replaced by the same digital asset after one or more defects therein have been corrected and then resubmitted. As still another example, a particular digital asset might be removed and replaced by the same digital asset after the ownership or management of the digital asset changes. In any event, when the decision 204 determines that a prior digital asset has been replaced, the feedback data previously associated with the prior digital asset can be associated with a replacement digital asset. Alternatively, when the decision 204 determines that a prior digital asset has not been replaced, the block 206 can be bypassed. Following the block 206, or its being bypassed, the feedback association process 200 can end.

Hence, the feedback association process 200 is able to associate (e.g., migrate) prior feedback data from a prior digital asset to a replacement digital asset. As a result, the replacement digital asset can benefit from any advantageous feedback data that the prior digital asset was able to earn. Consequently, if a content provider needs to resubmit a digital asset (e.g., because of alterations, corrections or ownership/management changes), the resubmission can be done without a loss of feedback data.

Figure 3A:
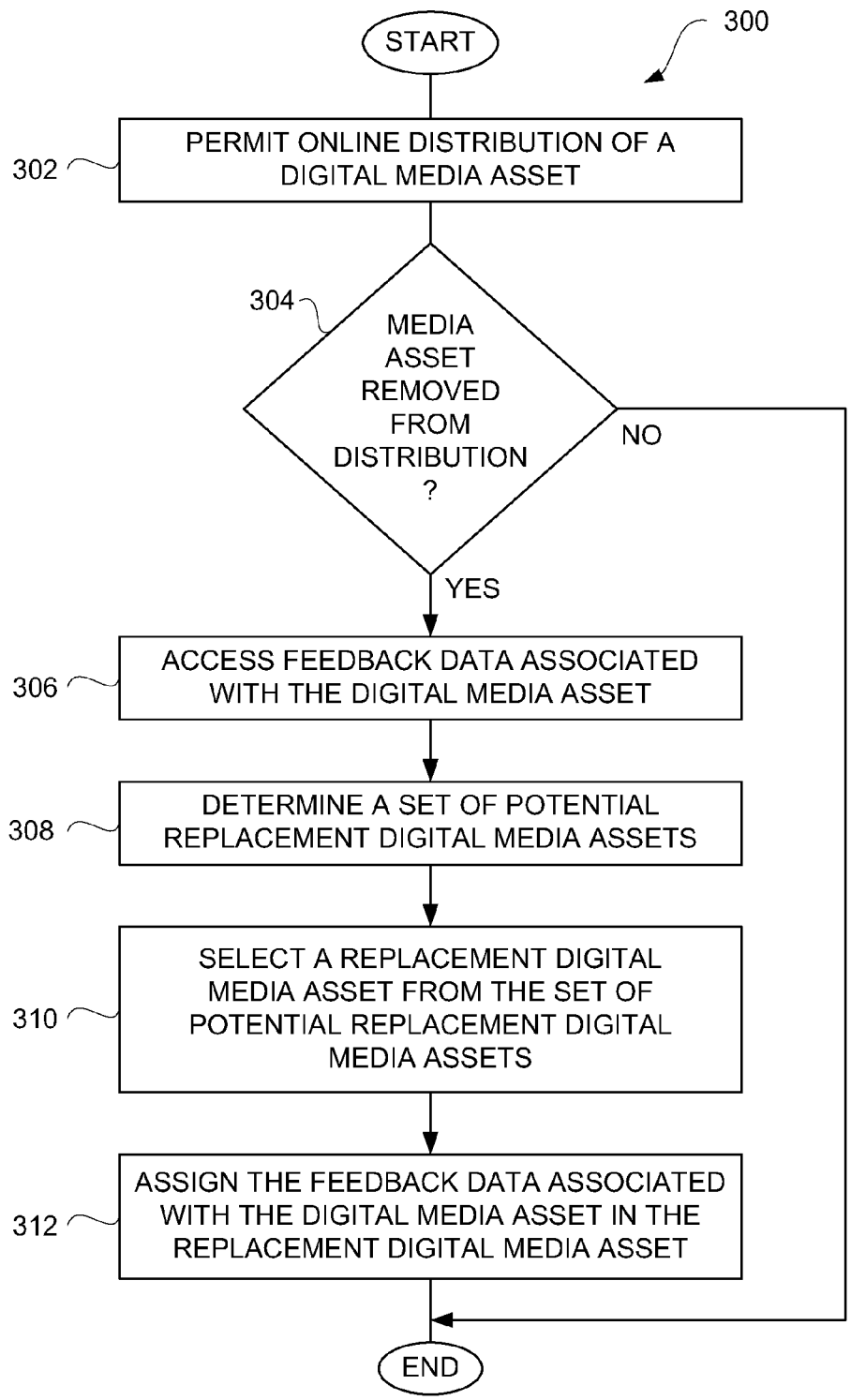
FIG. 3A is a flow diagram of a feedback assignment process according to one embodiment.

FIG. 3A is a flow diagram of a feedback assignment process 300 according to one embodiment. The feedback assignment process 300 can, for example, be performed by the digital asset submission and management system 104 illustrated in FIG. 1A or the feedback migration manager 152 illustrated in FIG. 1B.

The feedback assignment process 300 can permit 302 online distribution of a digital media asset. Typically, a content provider would submit a digital media asset to an online distribution system and request online distribution of the digital media asset. Assuming the digital media asset is acceptable for online distribution, the online distribution system would permit 302 online distribution of the digital media asset.

Next, a decision 304 can determine whether a media asset is to be removed from distribution. When the decision 304 determines that a media asset is to be removed from distribution, feedback data associated with the digital media asset can be accessed 306. In addition, a set of potential replacement digital media assets can be determined 308. Then, a replacement digital media asset can be selected 310 from the set of potential replacement digital media assets. After the replacement digital media asset has been selected 310, the feedback assignment process 300 can operate to assign 312 the feedback data associated with the digital media asset to the replacement digital media asset. Alternatively, when the decision 304 determines that a media asset has not been removed from distribution, the feedback assignment process 300 can bypass blocks 306-312 since no feedback assignment is being performed. Following the block 312, or its being bypassed, the feedback assignment process 300 can end.

Figure 3B:
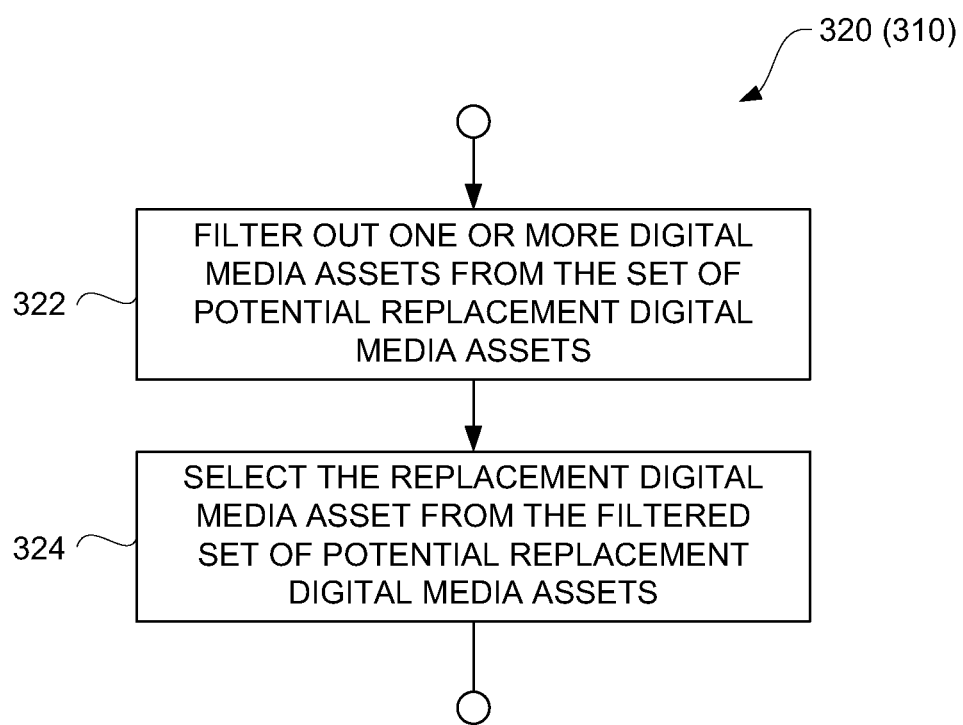
FIG. 3B is a flow diagram of an equivalent selection process according to one embodiment.

FIG. 3B is a flow diagram of an equivalent selection process 320 according to one embodiment. The equivalent selection process 320 is, for example, suitable for use as or within the block 310 illustrated in FIG. 3A. In this regard, the equivalent selection process 320 initially filters 322 out one or more digital media assets from the set of potential replacement digital media assets. A set of predetermined filter rules, which can be referred to as filter criteria, can be used to determine which, if any, of the digital media assets in the set of potential replacement digital media assets are to be filtered 322. In one implementation, the filter criteria can depend on one or more criteria, such as availability, content provider, parental guidance level (or indication), quality, or time. After the filtering 322 of the one or more digital media assets, assuming that there are one or more digital media assets remaining in the filtered set of potential replacement digital media assets, the replacement digital media asset can be selected 324 from the filtered set of potential replacement digital media assets. A set of predetermined selection rules, which can be referred to as selection criteria, can be used to select 324 the replacement digital media asset from the filtered set of potential replacement digital media assets. In one implementation, the selection criteria can depend on one or more criteria, such as availability, content provider, parental guidance level (or indication), quality, or time.

Although the equivalent selection process 320 is shown as having separate filtering and selecting operations, in other embodiments, the filtering and selecting can be combined such that the replacement digital media asset is selected from the set of potential replacement digital media assets. The selection can be made dependent on criteria such as availability, content provider, parental guidance level (or indication), quality, or time.

Figure 3C:
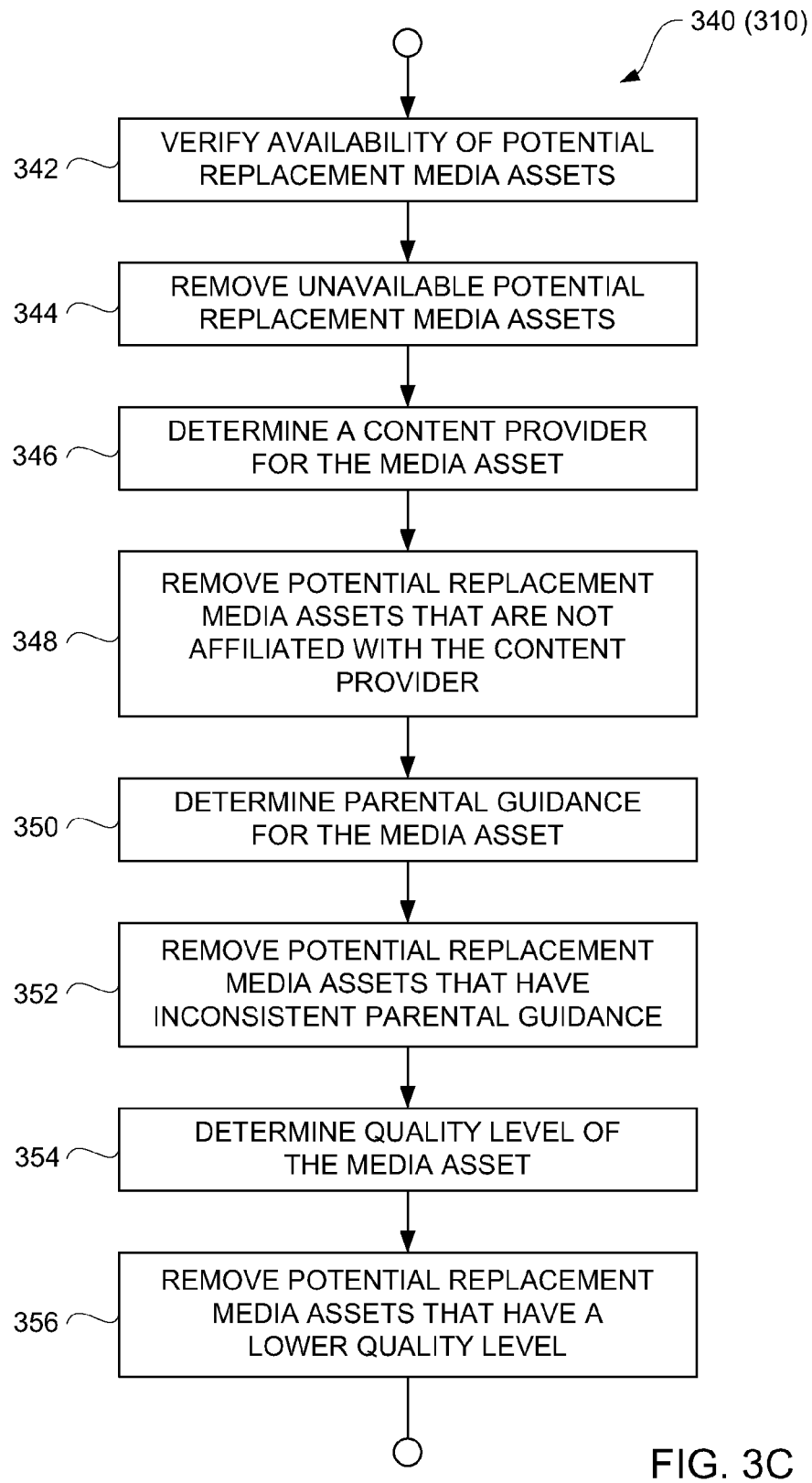
FIG. 3C is a flow diagram of an equivalent selection process according to another embodiment.

FIG. 3C is a flow diagram of an equivalent selection process 340 according to another embodiment. The equivalent selection process 340 is, for example, suitable for use as or within the block 310 illustrated in FIG. 3A. In one embodiment, the equivalent selection process 340 can be performed as or within the filter block 322 illustrated in FIG. 3B According to the equivalent selection process 340, availability of potential replacement media assets can be verified 342. Although the set of potential replacement digital media assets may have been previously determined, the verification 342 can in any case check for present availability of the specific potential replacement media assets. Then, those of the potential replacement media assets that are presently unavailable can be removed 344. Further, the equivalent selection process 340 can determine 346 a content provider for the media asset. Then, those potential replacement media assets that are not affiliated with the content provider can be removed 348 from the set of potential replacement digital media assets. Those affiliated with the content provider can include not only the content provider themselves by other provider that are grouped with the content provider (e.g., commonly owned providers).

Still further, the equivalent selection process 340 can determine 350 parental guidance for the media asset. Here, it is assumed that the media asset upon submission to the online distribution system causes an indication of parental guidance to be provided for the media asset. Hence, the determination 350 of the parental guidance for the media asset can be performed using the previously submitted information concerning the media asset. In addition, those one or more potential replacement media assets that have inconsistent parental guidance can be removed 352 from the potential replacement media assets.

Further still, the equivalent selection process 340 can determine 354 a quality level for the media asset. Then, those one or more potential replacement media assets that have a lower quality level than the quality level for the media asset can be removed 356.

FIG. 3C operates to filter out those of the potential replacement media assets that are not selectable as a replacement for the media asset that has been removed. The filtering provided by the equivalent selection process 340 illustrated in FIG. 3C can consider availability, content provider, parental guidance, and quality level. However, in general, the filtering can make use of any one or more of availability, content provider, parental guidance, and quality level.

Figure 3D:
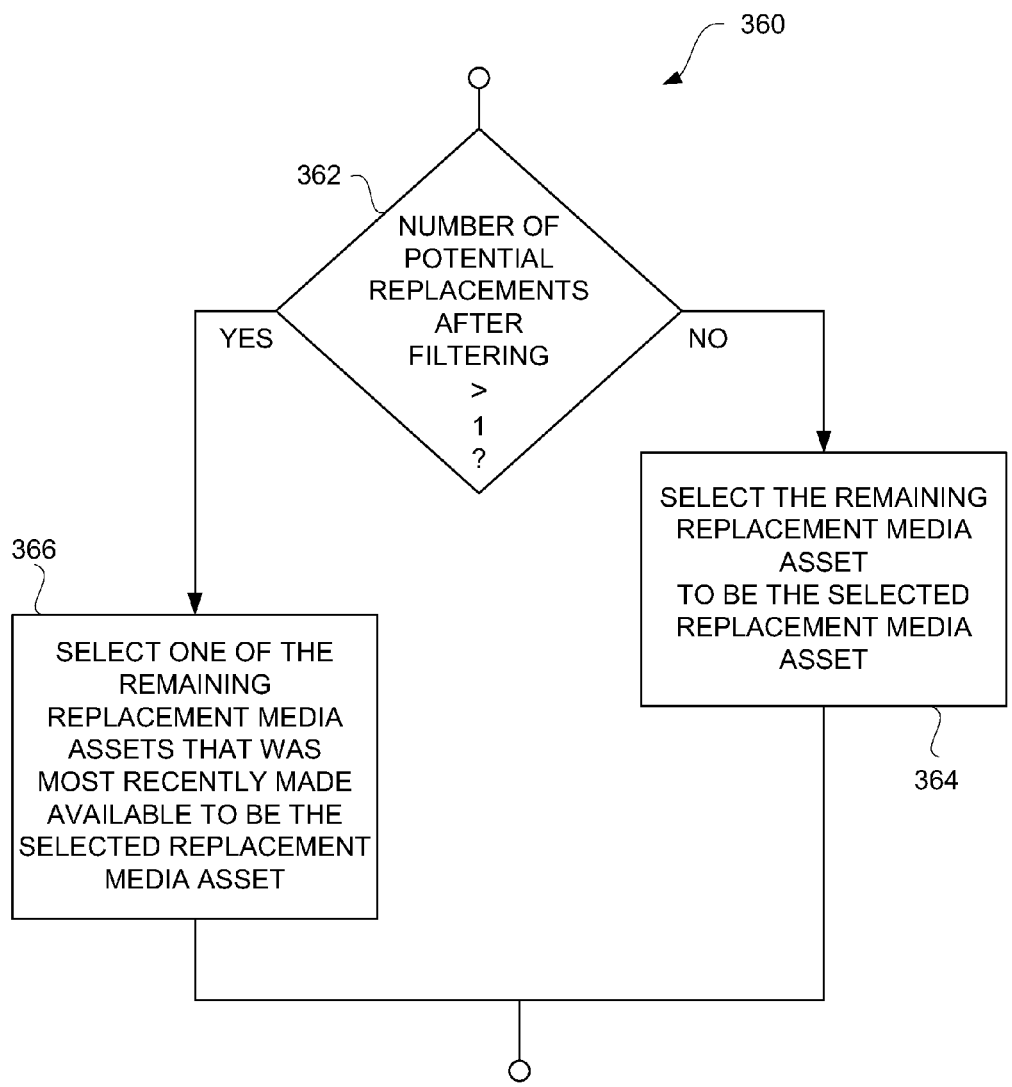
FIG. 3D illustrates a replacement selection process according to one embodiment.

After filtering has occurred (such as shown in FIG. 3C), additional processing can be performed to carry out a selection operation. In this regard, FIG. 3D illustrates a replacement selection process 360 according to one embodiment. The replacement selection process 360 can, for example, be performed by the block 310 illustrated in FIG. 3A. In one embodiment, the replacement selection process 360 can be performed following the filter block 322 illustrated in FIG. 3B or following the equivalent selection process 340 illustrated in FIG. 3C.

In any case, when the replacement selection process 360 is performed, a decision 362 can determine whether the number of potential replacement media assets after filtering (e.g., FIG. 3C) is greater than one (1). When the decision 362 determines that the number of potential replacement media assets remaining after the filtering is not greater than one, then (assuming that there is one potential replacement media asset), the remaining replacement media asset can be selected 364 to be the selected replacement media asset.

Alternatively, when the decision 362 determines that the number of potential replacement media assets remaining after the filtering is greater than one, then one of the remaining replacement media assets is selected 366 to be the selected replacement media asset. In one implementation, the selection 366 from the remaining replacement media assets can be based on the one of the remaining replacement media assets that was most recently made available. In another implementation, the selection 366 from the remaining replacement media assets can be based on the one of the remaining replacement media assets that has the highest quality. In still another implementation, the selection 366 from the remaining replacement media assets can be based on a combination of (i) the remaining replacement media assets that was most recently made available, and (ii) the remaining replacement media assets that having the highest quality. Following the blocks 364 and 366, the replacement selection process 360 can end with the selected replacement media asset having been selected.

Figure 4A:
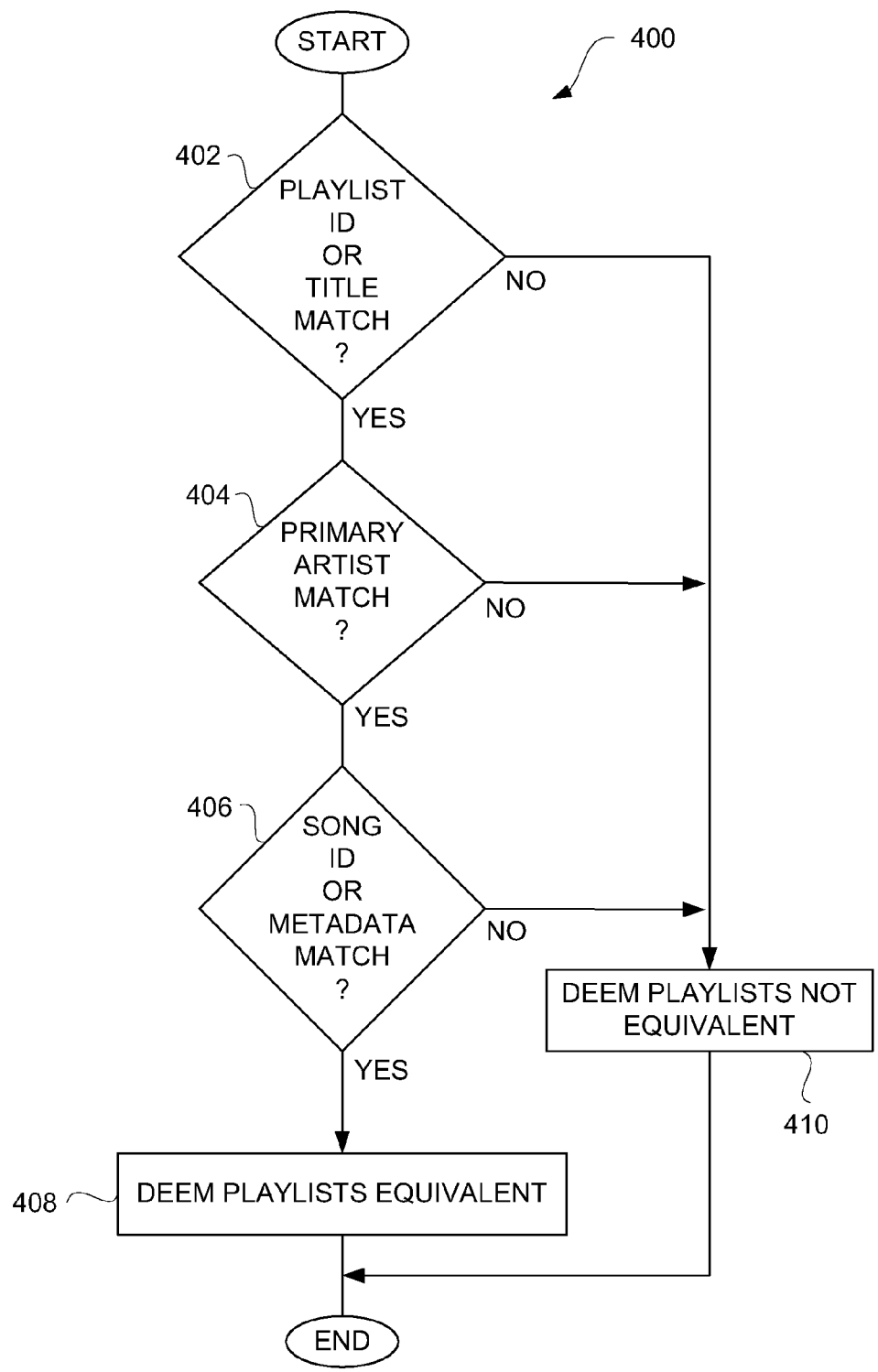
FIG. 4A is a flow diagram of a playlist equivalency process according to one embodiment.
Figure 4B:
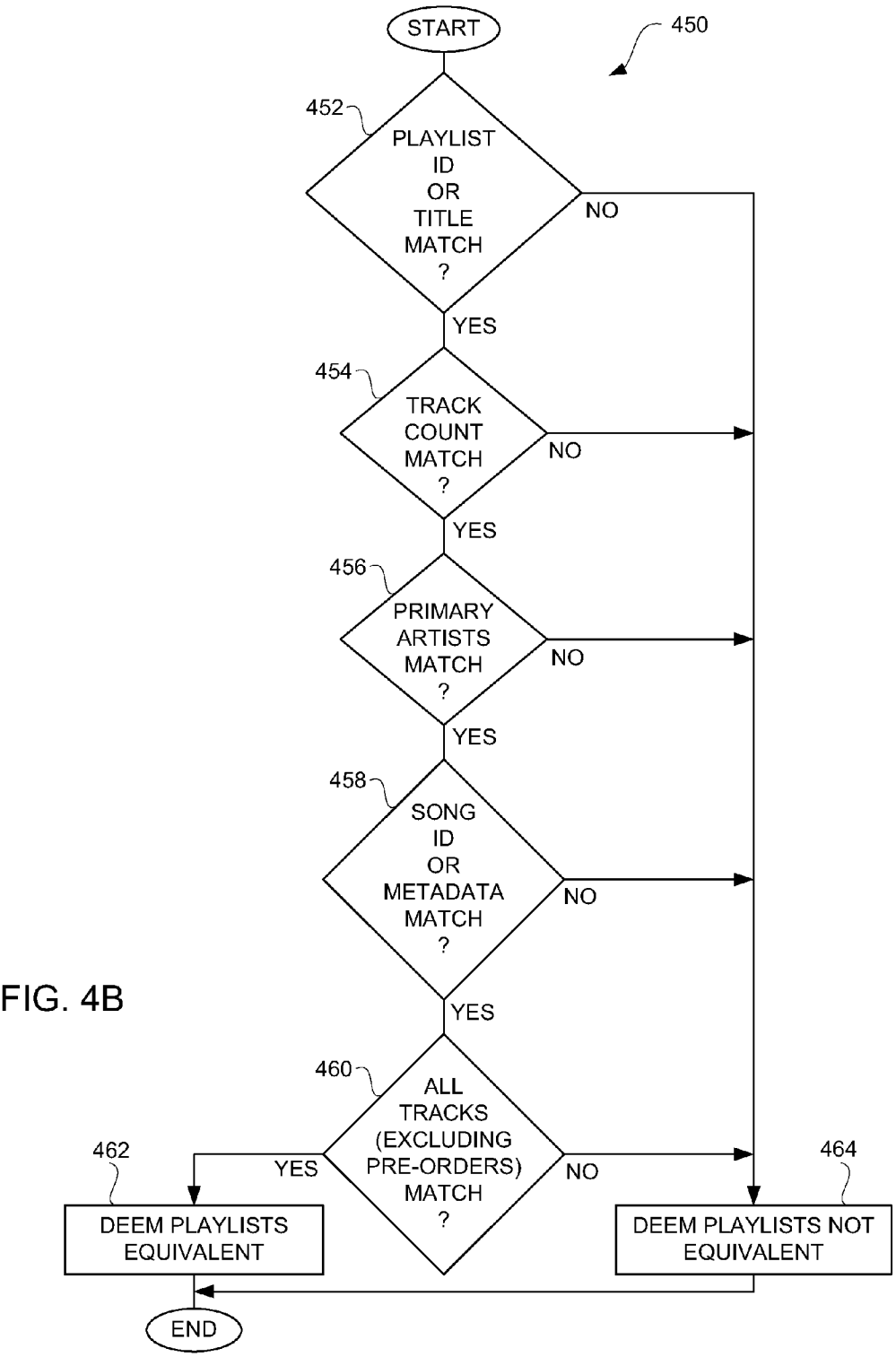
FIG. 4B is a flow diagram of a playlist equivalency process according to one embodiment.

The potential replacement media items are those media items that are considered to be equivalent for purposes of transfer of feedback data. One type of media assets are playlists. Equivalency of playlists can be determined in a variety of different ways. FIGS. 4A and 4B provide examples of equivalency determinations for playlists.

FIG. 4A is a flow diagram of a playlist equivalency process 400 according to one embodiment. The playlist equivalency process 400 can evaluate whether a subsequently submitted playlist can be considered an equivalent to a prior submitted playlist. As discussed herein, if playlists are deemed sufficiently equivalent, feedback data is permitted to be transferred from the prior submitted playlist (which is often now removed or otherwise rendered unavailable) to the subsequently submitted playlist.

The playlist equivalency process 400 can begin with a decision 402 that determines whether a playlist identifier (ID) or title of the prior submitted playlist and the subsequently submitted playlist match. When the playlist identifier or title of the prior submitted playlist and the subsequently submitted playlist are determined to match, a decision 404 can determine whether the primary artist on both the prior submitted playlist and the subsequently submitted playlist match. When the decision 404 determines that the primary artist on both the prior submitted playlist and the subsequently submitted playlist match, a decision 406 can determine whether a song identifier (ID) or metadata for each of the songs on the respective playlists match. When the decision 406 determines that the song identifier or metadata for each of the songs on the prior submitted playlist and the subsequently submitted playlist do match, the respective playlist can be deemed 408 to be equivalent. As a result, the subsequently submitted playlist can be permitted to receive feedback data previously associated with the prior submitted playlist. On the other hand, when any of the decisions 402-406 of the playlist equivalency process 400 indicate that there is not a match, the respective playlists can be deemed 410 to be not equivalent. In this case, the subsequently submitted playlist is not permitted to receive the feedback data previously associated with the prior submitted playlist. Following the blocks 408 and 410, the playlist equivalency process 400 can end.

FIG. 4B is a flow diagram of a playlist equivalency process 450 according to one embodiment. The playlist equivalency process 450 can evaluate whether a subsequently submitted playlist can be considered an equivalent to a prior submitted playlist. As discussed herein, if playlists are deemed sufficiently equivalent, feedback data is permitted to be transferred from the prior submitted playlist (which is often now removed or otherwise rendered unavailable) to the subsequently submitted playlist.

The playlist equivalency process 450 can begin with a decision 452 that determines whether a playlist identifier (ID) or title of the prior submitted playlist and the subsequently submitted playlist match. When the playlist identifier or title of the prior submitted playlist and the subsequently submitted playlist are determined to match, a decision 454 can determine whether the track counts on the prior submitted playlist and the subsequently submitted playlist match. When the decision 454 determines that the track counts on the prior submitted playlist and the subsequently submitted playlist match, a decision 456 can determine whether the primary artist on both the prior submitted playlist and the subsequently submitted playlist match. When the decision 456 determines that the primary artist on both the prior submitted playlist and the subsequently submitted playlist match, a decision 458 can determine whether a song identifier (ID) or metadata for each of the songs on the respective playlists match. When the decision 458 determines that the song identifier or metadata for each of the songs on the prior submitted playlist and the subsequently submitted playlist match, a decision 460 can determine whether all of the tracks (excluding pre-orders) of the respective playlists match. When the decision 460 determines that all of the tracks (excluding pre-orders) of the respective playlists match, the respective playlists can be deemed 462 to be equivalent. As a result, the subsequently submitted playlist can be permitted to receive feedback data previously associated with the prior submitted playlist.

On the other hand, when any of the decisions 452-460 of the playlist equivalency process 450 indicate that there is not a match, the respective playlists can be deemed 464 to be not equivalent. In this case, the subsequently submitted playlist is not permitted to receive the feedback data previously associated with the prior submitted playlist. Following the blocks 462 and 464, the playlist equivalency process 450 can end.

Several examples of playlist equivalency scenarios are provided below. These examples can be in accordance with the playlist equivalency process 450.

Example 1

[Prior Submitted Playlist]
Title: Madonna—Confessions on a Dance Floor
ID: 123
Tracks:
  1. Hung Up
  2. Get Together
  3. Sorry
  4. Future Lovers
  5. I Love New York
  6. Let It Will Be
  7. Forbidden Love
  8. Jump
  9. How High
  10. Isaac
  11. Push (Pre-Order Only)
  12. Like it or Not (Pre-Order Only)

[Subsequently Submitted Playlist]
Title: Madonna—Confessions on a Dance Floor
ID: 456
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not
Result: Not Equivalent
Reason: Disregard pre-order only tracks, track counts differ

Example 2

[Prior Submitted Playlist]
Title: Madonna—Confessions on a Dance Floor
ID: 222
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not
[Subsequently Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
Result: Not Equivalent
Reason: Different number of tracks where extra tracks aren't pre-order

Example 3

[Prior Submitted Playlist]
Title: Madonna—Confessions on a Dance Floor
ID: 222
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not (Pre-Order Only)
[Subsequently Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. XYZ (Pre-Order Only)
Result: Equivalent
Reason: Same tracks (and count) that aren't pre-orders

Example 4

[Prior Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not (Pre-Order Only)
[Subsequently Submitted Playlist]
Title: Madonna—Confessions on a Dance Floor
ID: 444
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
RESULT: Equivalent
REASON: Extra track is pre-order only

Example 5

[Prior Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac (Pre-Order Only)
   11. Push (Pre-Order Only)
   12. Like it or Not (Pre-Order Only)
   13. Footprints
   14. Hey there, whats up?
[Subsequently Submitted Playlist]
Title: Madonna—Confessions on a Dance Floor
ID: 444
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Footprints
RESULT: Not Equivalent
REASON: "Hey there, what's up?" isn't pre-order only and is not on playlist with ID 444.

Example 6

[Prior Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not (Pre-Order Only)
[Subsequently Submitted Playlist]
Title: Madonna—Confessions on a Dance Floor
ID: 444
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. How are you?
RESULT: Not Equivalent
REASON: "How are you?" is not pre-order only and is not present on the prior submitted playlist.

Example 7

[Prior Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not (Pre-Order Only)
[Subsequently Submitted Playlist]
Title: Madonna—Confessions on a Dance Floor
ID: 444
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac
   11. Push
   12. Like it or Not (Pre-Order Only)
   13. How are you? (Pre-Order Only)
RESULT: Equivalent
REASON: "How are you?" is pre-order only; "Like it or not" is pre-order only but it is present on both playlists

Example 8

[Prior Submitted Playlist]
Title: Madonna—Confessions on a Dance Floor
ID: 333
Tracks:
   1. Hung Up
   2. Get Together
   3. Sorry
   4. Future Lovers
   5. I Love New York
   6. Let It Will Be
   7. Forbidden Love
   8. Jump
   9. How High
   10. Isaac 11. Push
12. Like it or Not

[Subsequently Submitted Playlist]
Title: Madonna—Confessions on a Dance Floor
ID: 444
Tracks:
1. Hung Up
2. Get Together
3. Sorry
4. Future Lovers
5. I Love New York
6. Let It Will Be
7. Forbidden Love
8. Jump
9. How High
10. Isaac
11. Push
12. Like it or Not (Pre-Order Only)
13. How are you? (Pre-Order Only)
RESULT: Not Equivalent
REASON: Discard pre-order only tracks and "Like it or Not" is not on the subsequently submitted playlist.

In one embodiment, after user feedback data has been assigned to a replacement digital asset, the feedback data can be used and further accumulated with respect to the replacement digital asset. However, in some instances, it may be desirable to transfer back the feedback data to the prior digital asset. For example, if the prior digital asset was removed or made unavailable inadvertently or by mistake, the feedback data can be transferred back to the prior digital asset.

In one embodiment, a user interface can assist an administrator to initiate a manual transfer of feedback data. The manual transfer can transfer from one digital asset to another, or can override an otherwise automatic transfer, or can mark one or more digital assets as having non-transferable feedback data.

Figure 5:
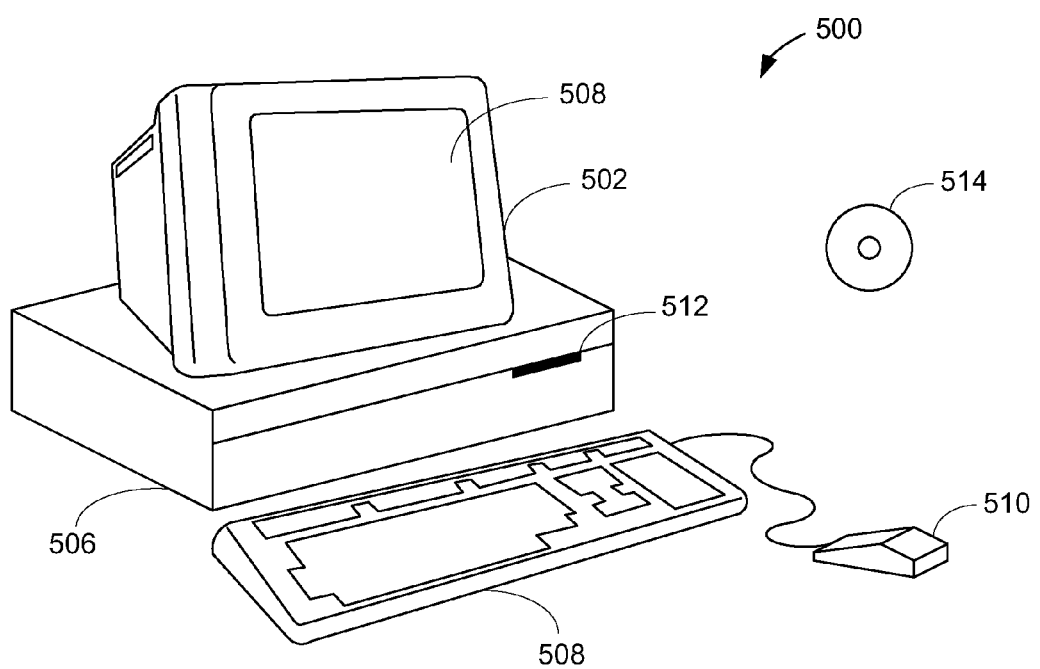
FIG. 5 shows an exemplary computer system suitable for use with embodiments.

FIG. 5 shows an exemplary computer system. One or more of the exemplary computer systems are suitable for use with at least one embodiment of the invention. The computer system 500 includes a display monitor 502 having a single or multi-screen display 504 (or multiple displays), a cabinet 506, a keyboard 508, and a mouse 510. The cabinet 506 houses a drive 512, such as for receiving a CD-ROM 514, a system memory and a mass storage device (e.g., hard drive or solid-state drive) (not shown) which may be utilized to store retrievable software programs incorporating computer code that implements the embodiment of the invention, data for use with embodiment(s) of the invention, and the like. Although the CD-ROM 514 is shown as an exemplary computer readable medium, other computer readable digital video including floppy disk, tape, flash memory, system memory, and hard drive may be utilized.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A digital content distribution system comprising:
a storage component storing a first version of a digital media asset;
a network component configured to receive feedback data for the first version of a digital media asset;
wherein the storage component is further configured to store feedback data for a first version of a digital media asset;
a processor configured to:
determine a set of potential replacement digital media assets that are sufficiently equivalent to a first version of a digital media asset, the first version of the digital media asset being previously available for purchase through an online store;
determine that the first version of a digital media asset has been replaced in the storage component by a second version of the digital media asset, wherein the second version of the digital media asset is selected from the set of potential replacement digital media assets and is currently available for purchase through the online store,
associate the feedback data associated with the first version of the digital media asset to the second version of the digital media asset; and
present the second version of the digital media asset in the online store along with the feedback data descriptive of the first version of the digital media asset.

2. The digital content distribution system of claim 1, wherein the feedback data includes one or more of popularity data, rating data or review data.

3. The digital content distribution system of claim 1, wherein the processor is further configured to unassociate the feedback data from the first version of the digital media asset.

4. The digital content distribution system of claim 1, wherein the network component is configured to receive feedback data for the first version of a digital media asset from users of the digital content distribution system.

5. The digital content distribution system of claim 1,
wherein each of the replacement digital media assets within the set of potential replacement digital media assets have a quality associated therewith, and
wherein the replacement digital media asset selected from the set of potential replacement digital media assets has the highest quality level.

6. The digital content distribution system of claim 1, wherein the digital media asset is at least one of an audio or video file, and the first version of the digital media asset was previously distributed and subject to feedback data provided by users.

7. The digital content distribution system of claim 1, wherein, after the determination that the second version of the digital media asset replaced the first version of the digital media asset, the feedback data assigned to the first version of the digital media asset that was previously distributed is assigned to the second version of the digital media asset.

8. A computer-implemented method for migrating feedback data between digital media assets, comprising:
storing feedback data for a first version of a digital media asset, the feedback data being user provided data descriptive of the first version of the digital media asset;
determining a set of potential replacement digital media assets that are sufficiently equivalent to a first version of a digital media asset, the first version of the digital media asset being previously available for purchase through an online store;
replacing the first version of the digital media asset with a second version of the digital media asset, wherein the second version of the digital media asset is selected from the set of potential replacement digital media assets and is currently available for purchase through the online store;
in response to determining that the first version of a digital media asset has been replaced by the second version of the digital media asset, associating the feedback data associated with the first version of the digital media asset with the second version of the digital asset; and
presenting the second version of the digital media asset in an online store along with the feedback data descriptive of the first version of the digital media asset.

9. The computer-implemented method of claim 8, wherein the feedback data includes one or more of popularity data, rating data or review data.

10. The computer-implemented method of claim 8, further comprising:
unassociating the feedback data from the first version of the digital media asset.

11. The computer-implemented method of claim 8, further comprising:
selecting the second version of the digital media asset from one or more potential replacement versions having an upgraded quality level.

12. The computer-implemented method of claim 11, further comprising:
selecting the second version of the digital media asset from one or more potential replacement versions having a highest upgraded quality level.

13. The computer-implemented method of claim 8,
wherein the first version of the digital media asset has a content provider indicator associated therewith, and
wherein replacing the first version of the digital media asset with a second version of the digital media asset further comprises selecting a replacement digital media asset having a related content provider indicator as the first version of the digital media asset.

14. The computer-implemented method of claim 8, further comprising:
prior to replacing the first version of the digital media asset with a second version of the digital media asset, determining that the first version of the digital media asset is no longer available for distribution.

15. The computer-implemented method of claim 8,
wherein the first version of the digital media asset has a parental guidance indicator associated therewith, and
wherein replacing the first version of the digital media asset with a second version of the digital media asset further comprises selecting a replacement digital media asset having a related parental guidance indicator as the first version of the digital media asset.

16. The computer-implemented method of claim 8, further comprising:
selecting the second version of the digital media asset from one or more potential replacement versions that was most recently submitted or approved for distribution.

17. A non-transitory computer-readable storage medium storing instructions which, when executed by a computing device, cause the computing device to perform a method for migrating feedback data between digital media assets, comprising:
storing feedback data for a first version of a digital media asset, the feedback data being user provided data descriptive of the first version of the digital media asset;
determining a set of potential replacement digital media assets that are sufficiently equivalent to a first version of a digital media asset, the first version of the digital media asset being previously available for purchase through an online store;
replacing the first version of the digital media asset with a second version of the digital media asset, wherein the second version of the digital media asset is selected from the set of potential replacement digital media assets and is currently available for purchase through the online store;
in response to determining that the first version of a digital media asset has been replaced by the second version of the digital media asset, associating the feedback data associated with the first version of the digital media asset with the second version of the digital media asset; and
presenting the second version of the digital media asset in an online store along with the feedback data descriptive of the first version of the digital media asset.

18. The non-transitory computer-readable storage medium of claim 17, storing further instructions which, when executed by a computing device, cause the computing device to perform additional steps of:
selecting the second version of the digital media asset from one or more potential replacement versions having an upgraded quality level.

19. The non-transitory computer-readable storage medium of claim 18, storing further instructions which, when executed by a computing device, cause the computing device to perform additional steps of:
  selecting the second version of the digital media asset from one or more potential replacement versions having a highest upgraded quality level.

20. The non-transitory computer-readable storage medium of claim 17, wherein the first version of the digital media asset has a content provider indicator associated therewith, and wherein replacing the first version of the digital media asset with a second version of the digital media asset further comprises selecting a replacement digital media asset having a related content provider indicator as the first version of the digital media asset.

21. The non-transitory computer-readable storage medium of claim 17, wherein the first version of the digital media asset has a content provider indicator associated therewith, wherein the first version of the digital media asset has a parental guidance indicator associated therewith, and wherein replacing the first version of the digital media asset with a second version of the digital media asset further comprises selecting a replacement digital media asset having a related parental guidance indicator as the first version of the digital media asset.

22. The non-transitory computer-readable storage medium of claim 17, storing further instructions which, when executed by a computing device, cause the computing device to perform additional steps of:
  selecting the second version of the digital media asset from one or more potential replacement versions that was most recently submitted or approved for distribution.

23. The non-transitory computer-readable storage medium of claim 17, storing further instructions which, when executed by a computing device, cause the computing device to perform additional steps of:
  unassociating the feedback data from the first version of the digital media asset.

* * * * *